Nov. 24, 1953   N. H. ROY   2,660,423
VIBRATION AND SHOCK ISOLATOR
Filed Dec. 18, 1951   3 Sheets-Sheet 1
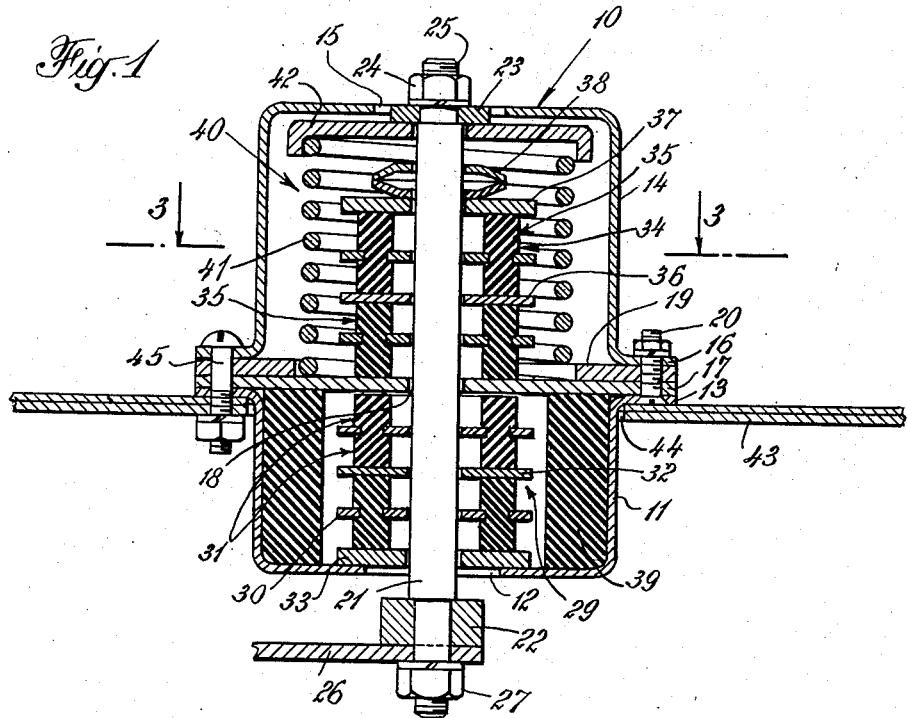
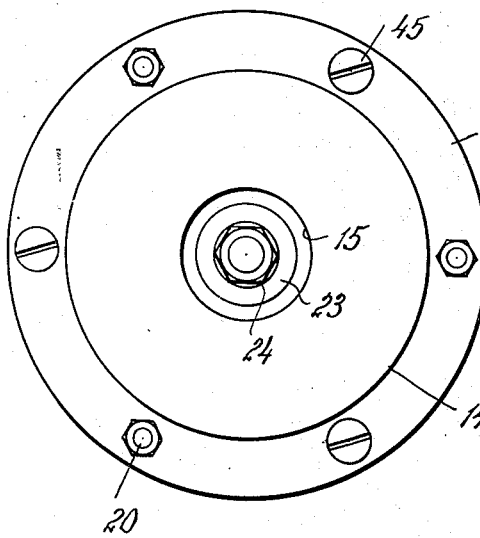
INVENTOR
Nereus H. Roy
BY
Pennie Edmonds Morton Barrows Taylor
ATTORNEYS

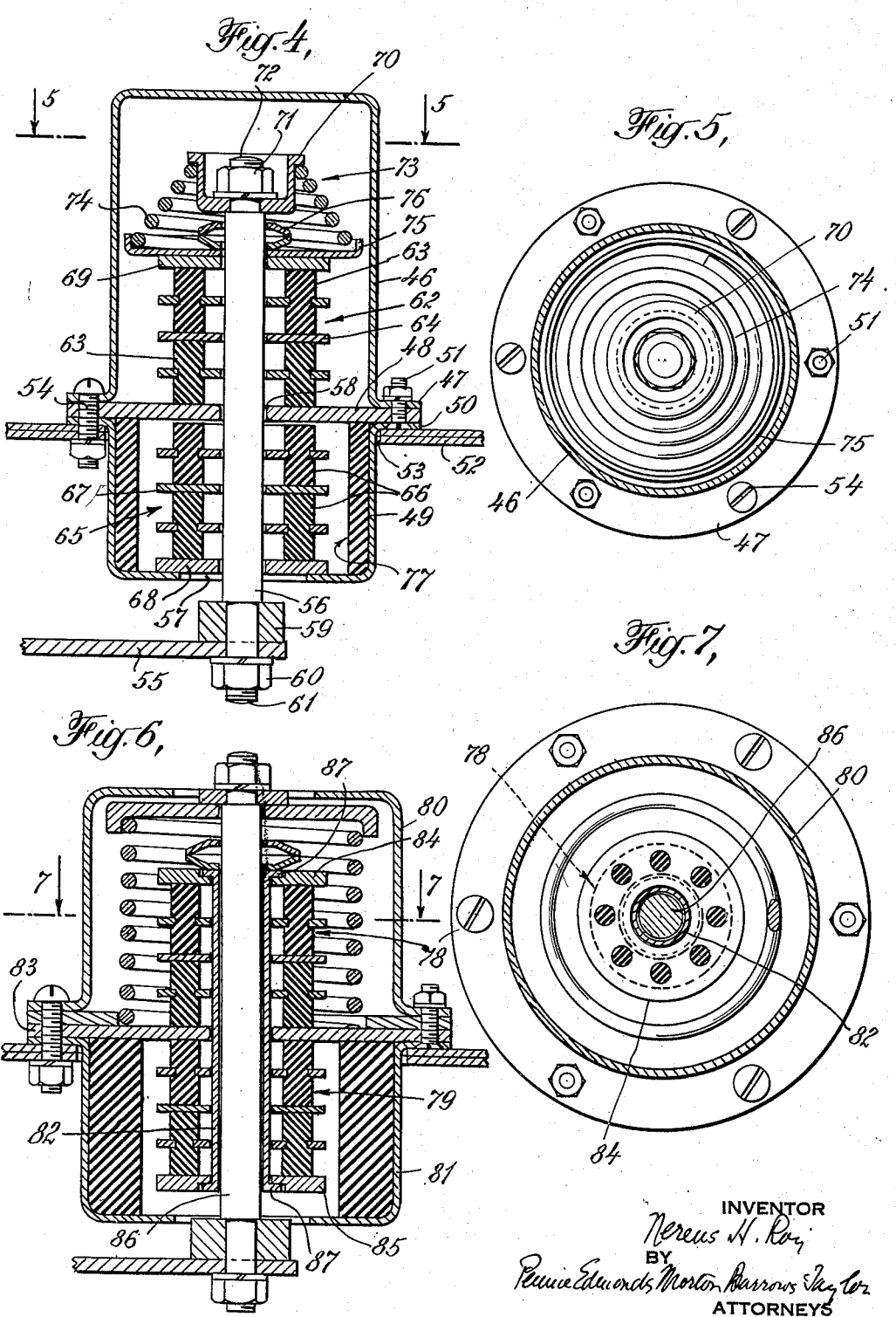

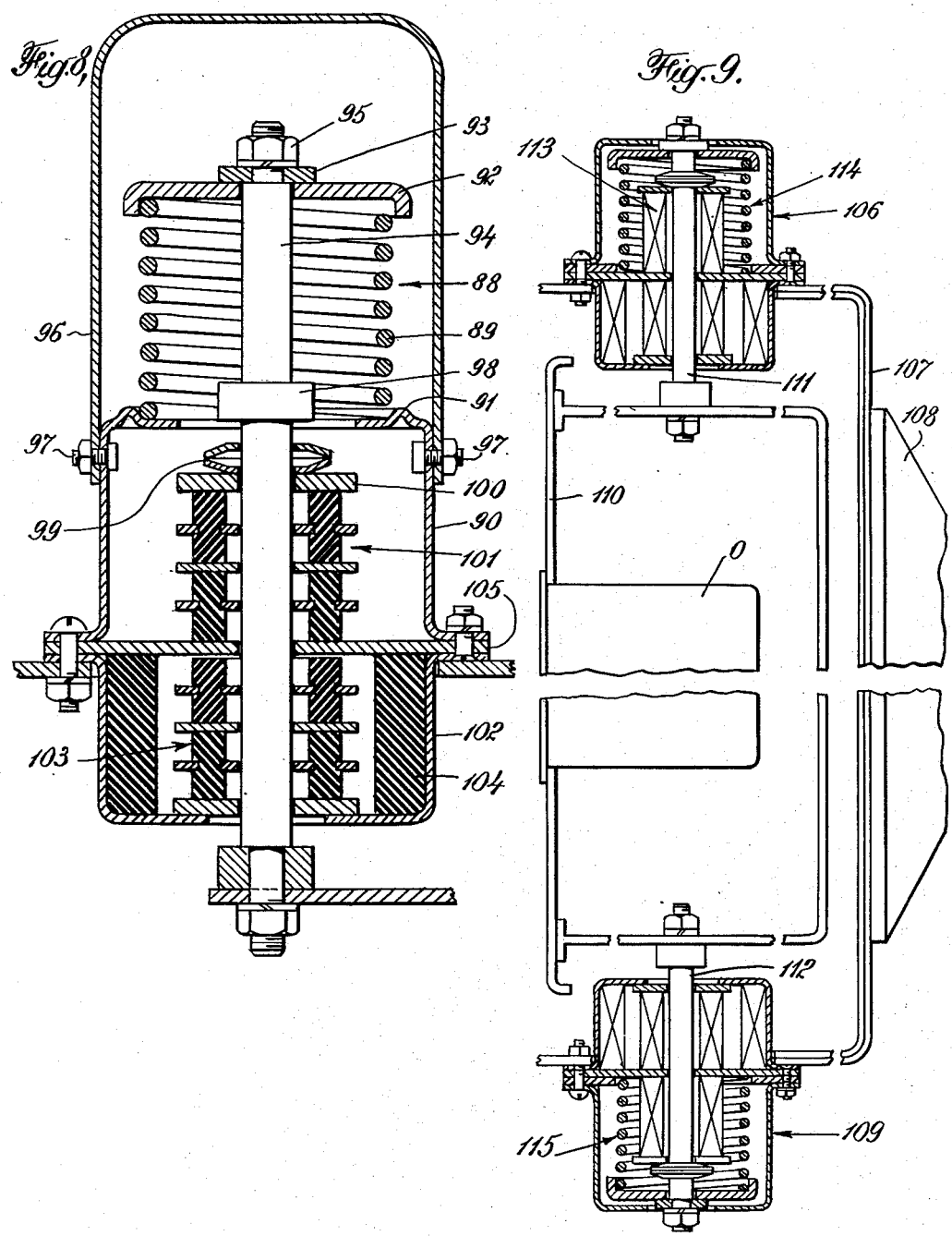

Patented Nov. 24, 1953

2,660,423

UNITED STATES PATENT OFFICE 2,660,423

VIBRATION AND SHOCK ISOLATOR

Nereus H. Roy, Glenbrook, Conn., assignor to Waugh Equipment Company, New York, N. Y., a corporation of Maine Application December 18, 1951, Serial No. 262,306

12 Claims. (Cl. 267—1)

This invention relates to yielding mounts to be interposed between an object and a fixed support, such a mount carrying the weight of the object and isolating vibration and absorbing shock. More particularly, the invention is concerned with a novel mount especially suitable for supporting objects which are of relatively light weight and of such construction as to require unusually good protection against low amplitude vibration and heavy shocks in all directions. The new mount may be advantageously employed in marine installations for supporting such objects as switchboard and like structures and forms of the new mount suitable for such application will, accordingly, be illustrated and described in detail for purposes of explanation.

On shipboard and especially on naval vessels, it is important that switchboard structures be supported on mountings which are capable of isolating the structures from the vibration of the engines and such mountings should also be capable of protecting the structures against high intensity shocks resulting from explosions, direct hits, and near misses. In addition, the mounting should be of such construction that those parts of the mounting, which absorb vibration, are fully protected against damage by shock.

The present invention is directed to the provision of a mount meeting the requirements stated and the new mount is of simple construction, is easily installed, and functions for indefinite periods without requiring attention or adjustment. Essentially, the mount includes stop means to be rigidly connected to a fixed support and a member extending through the stop means and movable lengthwise and laterally, the member being connected to the object. Vibration-isolating means are interposed between the member and stop means to isolate vibration and resist lengthwise movement of the member. Shock-absorbing means are also provided to resist both lengthwise and lateral movements of the member after an initial travel thereof, and the construction is such that, when the shock-absorbing means are functioning, the vibration-isolating means is inoperative and no forces are transmitted through it. The resilient element in the vibration-isolating means is preferably a metallic spring, while the shock-absorbing means preferably include one or more rubber springs.

For a better understanding of the invention, reference may be made to the accompanying drawings, in which Fig. 1 is a vertical sectional view through one form of the new mount;

Fig. 2 is a top plan view of the mount of Fig. 1;

Fig. 3 is a sectional view on the line 3—3 of Fig. 1;

Fig. 4 is a vertical sectional view of a second form of the new mount;

Fig. 5 is a sectional view on the line 5—5 of Fig. 4;

Fig. 6 is a vertical sectional view of a third form of the new mount;

Fig. 7 is a sectional view on the line 7—7 of Fig. 6;

Fig. 8 is a vertical sectional view of a fourth form of the new mount; and

Fig. 9 is a view, partly in elevation and partly in vertical section, of an installation, in which two of the new mounts of the type shown in Fig. 1, are used to support an object.

The new mount in the form shown in Figs. 1–3, inclusive, comprises a housing 10, which includes a lower cup 11 having a flat bottom with a central opening 12 and a peripheral flange 13 extending laterally at its upper end. The housing also includes an upper cup 14 similar to cup 11 but somewhat longer and having a flat upper end with a central opening 15 and a peripheral flange 16 extending laterally at its lower end. The cups are of the same diameter and they are assembled with their concavities facing each other and their flanges in alignment. A disc 17 is disposed between the flanges 13, 16 of the cups and has a central opening 18 aligned with the openings 12, 15 in the cups. The disc 17 is of the same outer diameter as the flanges, and a flat ring 19 of the same outer diameter as the disc is mounted on top of the disc and between it and flange 16. The inner diameter of the ring is substantially greater than that of the aligned openings through the cups and the disc. The assembly of the cups, disc, and ring is secured together by a number of bolts 20 extending through aligned openings in the flanges of the cups and in the disc and ring.

A rod 21 extends through the openings 12, 15 in the cups, the central opening 18 in the disc 17, and the ring 19, and the lower end of the rod lying below the bottom of cup 11 is shouldered and encircled by a collar 22 engaging the shoulder and of less diameter than opening 12. At its upper end, the rod is also shouldered and encircled by a washer 23 of less diameter than opening 15 and held against the shoulder by a nut 24 threaded on the outer end 25 of the rod. The lower end of the rod is to be connected to the object to be supported and the connection is made by an arm 26 having an opening, through which the rod extends, the arm being held against collar 22 by a nut 27 threaded on the lower end 28 of the rod.

The lower cup 11 contains a shock-absorbing unit generally designated 29, which encircles rod 21 and is made up of a plurality of rubber springs, separator plates between adjacent springs, and a follower plate. Each spring consists of a flat metal ring 30 having rubber rings 31 applied to opposite faces thereof and connected through openings in the metal ring, and the separator plate 32 between the springs is flat and annular. The shock-absorbing unit shown includes two rubber springs and the upper spring is spaced from the under surface of disc 17. The lower end of the lower spring engages the upper surface of a flat follower ring 33, which encircles rod 21 and rests upon the inner end of cup 11. The follower 33 is engageable by collar 22 on the rod, when the rod moves upwardly a sufficient distance.

Within the upper cup 10, the rod 21 is encircled by a second shock-absorbing unit 34, which is made up of a pair of rubber springs 35, a divider plate 36 lying between and separating the springs, and a follower plate 37 on top of the upper spring. The lower rubber spring rests upon the disc 17 and a pair of dished metallic discs 38, mounted with their concavities opposed and of the type known as Belleville springs, rest upon the top of follower 37 and encircle the rod.

The lower cup 11 contains a third shock-absorbing unit, which takes the form of a rubber sleeve 39, which lies within the cup in contact with the cylindrical surface thereof and extends from the bottom of the cup to engage the under surface of disc 17. The sleeve has an inner diameter considerably greater than the outer diameter of follower 33, but may be engaged by the follower when the latter moves laterally.

The upper cup 10 contains a vibration-isolating unit 40 including a coil spring 41, which encircles rod 21 and the shock-absorbing unit 34 and is seated at its lower end on top of disc 17 within ring 19, the ring serving to center the lower end of the spring. The spring extends upwardly above the top of the spring discs 38 and, at its upper end, supports a flanged follower disc 42, which is held by the spring in contact with the inner surface of washer 23.

In use, the mount is attached to a rigid support 43 by having its lower cup 11 inserted through an opening 44 in the support, and the mount is then secured to the support by bolts 45, which extend through aligned openings in the support, the cup flanges 13, 16 and the disc 17 and ring 19. The object is then connected by arm 26 to rod 21, and the weight of the object is thus normally taken by spring 41 of the vibration-isolating unit. The cups and disc 17 serve as stop means rigidly secured to the support, and the collar 22 and washer 23 engaging shoulders on the rod serve as abutments.

In the normal operation of the mount, vibration of the support is isolated by the alternate compression and expansion of the coil spring 41 of the vibration-isolating unit 40, and the mount is so constructed that the travel of follower 42 between its normal position shown and the position, in which it engages the top of the upper spring disc 38, is greater than the amplitude of the vibration, to which the object is normally subjected. In the event that the support is subjected to a heavy shock, which causes the support to move upward relative to the object, the spring discs 38 engage the follower 42 in contact with the upper abutment 23 on the rod, and the discs are initially flattened, after which the shock-absorbing unit 34 is compressed between the abutment and stop 17. The compression of unit 34 occurs before the coil spring 41 of the vibration-isolating unit has gone solid, so that the shock is absorbed by unit 34 and the spring discs 38 without damage to spring 41. If the shock is in the other direction with the support moving downwardly, the follower 33 of the lower shock-absorbing unit 31 engages the lower abutment 22 on the rod, and the shock is absorbed by compression of the unit between the abutment and disc 17. On occasion, the shock may include a horizontal component tending to give the mount a movement, in which the rod 21 rocks on the wall of opening 18 in disc 17, so that the effect is as if the upper end of the rod above disc 17 were moved laterally in one direction and the lower end of the rod below disc 17 moved in the opposite direction. If the horizontal component of the shock is sufficient, follower 33 moves into engagement with the third shock-absorbing unit formed by sleeve 39 and the component is thus absorbed.

The modified form of the new mount shown in Figs. 4 and 5 comprises an upper cup 46 having a peripheral flange 47 resting upon a disc 48. A lower cup 49 has a peripheral flange 50 engaging the other surface of disc 48, and the cups and disc are secured together by bolts 51 passing through openings in the flanges and disc. In securing the mount to the support 52, an opening 53 is formed in the support and the lower cup 49 passed through the opening. The mount is then attached to the support by bolts 54 passing through aligned openings in the support, the flanges, and the disc.

The object to be supported is connected by an arm 55 to a rod 56, which passes through aligned openings 57 and 58 in the lower end of cup 49 and in disc 48, respectively. The lower end of the rod is of reduced diameter to form a shoulder engaged by an abutment collar 59 telescoped over the end of the rod, and the rod extends through an opening in arm 55. The arm and collar are then held in place by a nut 60 on the threaded end 61 of the rod.

The upper cup 46 contains a shock-absorbing unit 62 including rubber springs 63 separated by a flat divider ring 64, and a similar shock-absorbing unit 65 including rubber springs 66 separated by a flat divider ring 67 is contained within the lower cup. The unit 65 includes a flat follower ring 68 resting on the bottom of the lower cup 49 and the unit 62 has a flat follower ring 69 at its top. The rod 56 extends through the openings in the rings and through central openings through the springs.

The upper end of the rod 56 is of reduced diameter and extends through an opening in a cup-shaped follower 70, which is held in place by a nut 71 on the threaded end 72 of the rod. The follower serves as part of a vibration-isolating unit 73 and has a peripheral flange engaged by the upper end of a coil spring 74, the lower end of which rests upon a flanged follower disc 75 resting on top of follower ring 69. A pair of dished washers 76 of the Belleville spring type encircle rod 56 and rest upon the upper face of follower disc 75.

The mount includes a third shock-absorbing unit 77 taking the form of a rubber sleeve, which is disposed within the lower cup 49 against the cylindrical wall thereof and engages the bottom of the cup and the under surface of disc 48.

The mount shown in Figs. 4 and 5 functions in the same way as that shown in Fig. 1 and differs therefrom in that the spring 74 of the vibration-isolating unit 73 is seated upon the follower disc 75 supported by the shock-absorbing unit 62 within cup 46, whereas, in the construction shown in Fig. 1, the spring 41 of the vibration-isolating unit 40 is seated on disc 17 attached to the support. In the Fig. 4 construction, part of the vibration may be taken by the spring 74 and part by the shock-absorbing unit 62, although the characteristics of the rubber springs 63 in the shock-absorbing unit are normally such that the unit is not compressed to any substantial extent as a result of vibration. In the event of a powerful shock tending to move the support upwardly, the spring washers 76 first engage the under surface of follower 70 and, thereafter, when the washers are flattened out, the shock-absorbing unit 62 within the upper cup 46 undergoes compression and absorbs the shock. In the event that the support is subjected to a shock tending to move it downwardly, the sleeve 59 on rod 56 engages follower 68, so that the shock-absorbing unit 65 within the lower cup undergoes compression. If any shock applied has a horizontal component tending to cause the rod 56 to rock on the wall of opening 58, the component will be absorbed by engagement of follower 68 and possibly part of the lower spring of shock-absorbing unit 65 with the third shock-absorbing unit 77.

The form of the new mount shown in Fig. 6 is similar in all respects to that shown in Fig. 1, except that the shock-absorbing units 78, 79 lying within the upper and lower cups 80, 81, respectively, are held under initial compression. For this purpose, a tube 82 extends through aligned openings in the units, the central disc 83 of the mount, and the follower 84 at the upper end of unit 78 and the follower 85 at the lower end of unit 79. The tube is of sufficient inner diameter to permit the rod 86 to move freely through it and the tube has flanges 87 at its ends, which engage the outer surfaces of the followers and are seated in recesses in their outer faces. In assembling the mount, the tube 82 used has a flange at one end only, as, for example, at its lower end and it is passed through the shock-absorbing units 78, 79 until its flange is seated in the recess in follower 85. The units are then compressed to the desired extent against the central disc 83, and the upper end of the tube is flanged, so that, when the compressive force is released, the tube with its flanges maintains the units under initial compression.

The initial compression applied to the two shock-absorbing units is such that ordinarily, when one unit is compressed, the other expands a like amount. Accordingly, if the mount is subjected to a shock in one direction and the shock is quickly reversed, the expanded unit will more quickly begin to absorb the shock in the reverse direction.

The form of the new mount shown in Fig. 8 is generally similar to that shown in Fig. 1, except that the vibration-isolating unit 88 includes a spring 89, which lies outside and is seated on top of the upper cup 90. The upper end of the cup is preferably formed with a bead 91 serving to center the lower end of the spring and the upper end of the spring bears against the under surface of a flanged follower disc 92 engaging an abutment washer 93 secured on the upper end of rod 94 by a nut 95. The shock-isolating unit 88 is disposed within a housing 96 of cup form, which is telescoped over the end of cup 90 and held in place by bolts 97. The rod 94 is provided with an abutment collar 98, which normally lies within the housing 96 in position to engage Belleville spring discs 99 resting on the top of a follower 100 disposed at the upper end of the shock-absorbing unit 101 within cup 90.

The mount includes a lower cup 102 containing a shock-absorbing unit 103 encircling the rod 94, and a third shock-absorbing unit 104 in the form of a rubber sleeve rests on the lower end of the cup and engages the inner cylindrical surface of the cup and the under surface of the disc 105 lying between the flanges of cups 90 and 102.

Two of the new mounts are ordinarily employed to protect an object against vibration and shock and a typical installation is shown in Fig. 9. This installation includes an upper mount 106 attached to the upper part of framework member 107 secured to the fixed support 108. The lower part of the framework carries a second mount 109, which is reversed with reference to mount 106. The object O is secured to a frame 110 having bars secured to the rods 111, 112 of the respective mounts. In the mounts, the shock-absorbing units have been indicated as at 113 by oblong figures, in which the diagonals are shown.

In the installation shown in Fig. 9, vibration in opposite directions is isolated by the vibration-isolating units 114, 115 in the upper and lower mounts, respectively, and shocks in either vertical direction are absorbed by a shock-absorbing unit in each mount, as are also horizontal components of shock. Mount 106 operates in the manner set forth in connection with the mount shown in Fig. 1, while mount 109, which is upside down, functions in the reverse manner.

In the mount illustrated in Fig. 1, the top of the shock-absorbing unit 29 lying within the lower cup 11 is spaced a short distance from the stop 17, so that the unit may readily center itself relative to rod 21. The shock-absorbing unit 34 within the upper cup 14 bears upon the stop only by reason of its own weight and may likewise center itself relative to the rod. As a result of the self-centering action of the units, the units and stop may move freely along the rod, as the support vibrates, and there is no transmission of such vibration to the object through the rod because of frictional drag of the units on the rod. For the same reasons, the upper ends of the shock-absorbing units 65 and 103 in the construction shown in Figs. 4 and 8 are slightly separated from the discs 48 and 105, respectively.

In the construction shown in Fig. 1, the spring 41 of the vibration-isolating unit is ordinarily of such length as to hold the follower disc 42 against the inside of the top of the upper cup 10, when the mount is unloaded, and the weight of the object causes a compression of the spring, which results in the follower disc being spaced from the top of the cup, as shown in the figure. The spring in the vibration-isolating unit in Fig. 6 is likewise ordinarily sufficiently long to maintain the follower disc at the upper end thereof against the top of the upper cup 80, and the space between the follower disc and the top of the cup shown in Fig. 6 indicates that the mount is under load.

I claim:

1. A mount for isolating vibration and absorbing shock between an object and a support, which comprises stop means, means for securing the stop means rigidly to the support, a member extending through the stop means and movable lengthwise and laterally, means for securing the member rigidly to the object, abutments spaced along the member, vibration-isolating means cooperating with the stop means and engaged with one of the abutments to resist lengthwise movement of the member in one direction, shock-absorbing means engaging the stop means at opposite sides thereof and acting through spaced abutments on the member to resist lengthwise movements of the member in both directions after an initial travel of the member, said shock-absorbing means being movable laterally with the member, and shock-absorbing means enclosing and normally spaced from the part of the first shock-absorbing means at one side of the stop means and acting through said part of the first shock-absorbing means to resist lateral movement of the member after an initial travel of the member.

2. A mount as defined in claim 1, in which the vibration-isolating means includes a spring seated at one end on the stop means and a follower having one face engaging the other end of the spring and its other face in contact with one of the abutments.

3. A mount as defined in claim 1, in which the stop means comprises a stop, the shock-absorbing means resisting lengthwise movements of the member comprises a pair of shock-absorbing units lying on opposite sides of the stop, and the shock-absorbing means resisting lateral movement of the member comprises a third shock absorbing unit enclosing and normally spaced from one of the first two units.

4. A mount as defined in claim 1, in which the stop means comprises a stop, the vibration-isolating means includes a spring encircling the member and seated at one end on the stop and a follower having one face engaging the other end of the spring and its other end normally engaging one of the abutments on the member, the shock-absorbing means resisting lengthwise movement of the member includes a pair of cushioning units encircling the member and engaging opposite sides of the stop, and the shock-absorbing means resisting lateral movement of the member includes a third cushioning unit encircling one of the units of the pair.

5. A mount as defined in claim 1, which includes a housing enclosing the vibration-isolating and shock-absorbing means and having a part acting as a stop.

6. A mount as defined in claim 1, which includes a housing having a central stop and enclosing the shock-absorbing means resisting lengthwise movements of the member, said shock-absorbing means including units lying against opposite sides of the central stop and the vibration-isolating means having one end engaging the housing.

7. A mount as defined in claim 1, in which the shock-absorbing means resisting lengthwise movements of the member comprise units engaging the stop means on opposite sides, and the vibration-isolating means includes a follower seated on the outer end of one of the shock-absorbing units and a spring engaging the outer face of the follower and an abutment on the member.

8. A mount as defined in claim 1, which includes a housing having a stop between its ends, the shock-absorbing means resisting lengthwise movement of the member comprising units within the housing engaging opposite faces of the stop, and the vibration-isolating means lying outside the housing and having one end engaging the housing and the other end engaging an abutment on the member.

9. A mount as defined in claim 1, in which the shock-absorbing means resisting lengthwise movements of the member comprise units engaging opposite sides of the stop means, and means engage the remote ends of the units and maintain them under initial compression.

10. A mount for isolating vibration and absorbing shock between an object and a support, which comprises stop means, means for securing the stop means rigidly to the support, a member extending through the stop means and movable lengthwise and laterally, means for securing the member rigidly to the object, abutments spaced along the member, vibration-isolating means co-operating with the stop means and encircling the member and engaged with one of the abutments to resist lengthwise movements of the member in one direction only, shock-absorbing means engaging the stop means at opposite sides thereof and encircling the member and acting through spaced abutments thereon to resist lengthwise movements of the member in both directions after an initial travel of the member, said shock-absorbing means being movable laterally with the member, and shock-absorbing means enclosing and normally spaced from the part of the first shock-absorbing means at one side of the stop means and acting through said part of the first shock-absorbing means to resist lateral movement of the member after an initial travel of the member.

11. A mount for isolating vibration and absorbing shock between an object and a support, which comprises a housing including a pair of cup-shaped elements having peripheral flanges and disposed with their flanges opposed, a stop plate between the flanges, means for securing the housing rigidly to the support, a member within the housing extending through an opening in the stop and out through an opening in one of the elements, a pair of shock-absorbing units within respective elements with their adjacent ends opposing opposite sides of the stop plate, the units encircling the member, abutments on the member spaced from the remote ends of respective units, the units acting through the abutments to resist endwise movements of the member after an initial travel thereof, a third shock-absorbing unit within one of the elements normally spaced from the unit of said pair, which lies within said element, the third unit being operable through said unit of the pair to resist lateral movement of the member after an initial movement thereof, and vibration-isolating means within the housing normally engaging an abutment on the member and resisting movement thereof in one direction.

12. A mount as defined in claim 11, in which the vibration-isolating means is seated on the outer end of one of the cup-shaped housing elements and normally engages an abutment on the member to resist movement thereof in one direction, and the housing includes a part enclosing the vibration-isolating means.

NEREUS H. ROY.

References Cited in the file of this patent

UNITED STATES PATENTS

| Number | Name | Date |
|---|---|---|
| 1,701,396 | Summers | Feb. 5, 1929 |
| 1,822,026 | Guy | Sept. 8, 1931 |
| 2,010,623 | Bugatti | Aug. 6, 1935 |
| 2,356,962 | Williams | Aug. 29, 1944 |
| 2,397,804 | Nakken et al. | Apr. 2, 1946 |
| 2,402,400 | Hewitt et al. | June 18, 1946 |